Nov. 5, 1963   C. W. ELLIS III, ET AL   3,109,496
ROTOR AND PITCH CONTROL MECHANISM FOR A HELICOPTER
Filed Jan. 5, 1961   4 Sheets-Sheet 1

INVENTORS
CHARLES W. ELLIS III
ROBERT B. BOSSLER JR.
NICHOLAS J. BOSCO
BY Teller & McCormick
ATTORNEYS Nov. 5, 1963 C. W. ELLIS III, ET AL 3,109,496
ROTOR AND PITCH CONTROL MECHANISM FOR A HELICOPTER
Filed Jan. 5, 1961 4 Sheets-Sheet 3

United States Patent Office 3,109,496
Patented Nov. 5, 1963

3,109,496
ROTOR AND PITCH CONTROL MECHANISM
FOR A HELICOPTER
Charles W. Ellis III, Windsor Locks, Robert B. Bossler, Jr., Bloomfield, and Nicholas J. Bosco, Thompsonville, Conn., assignors to Kaman Aircraft Corporation, a corporation of Connecticut
Filed Jan. 5, 1961, Ser. No. 80,842
20 Claims. (Cl. 170—160.25)

The invention relates to a pitch control mechanism for a helicopter and more particularly to such a control mechanism adapted for use in a helicopter intended for high speed forward travel.

In a helicopter, the amount of collective pitch that is required varies with the forward air speed. After vertical climb or hover, there is a progressive decrease in the required collective pitch as the helicopter moves forwardly at increasing speeds, and then at greater forward speeds there is a progressive increase in the required collective pitch as the speed of forward travel increases to its maximum. The required forward longitudinal cyclic pitch increases at a progressively increasing rate as the forward speed is increased.

The general object of the invention is to provide a pitch control mechanism wherein during certain portions of the collective pitch increasing action a prescribed amount of forward longitudinal cyclic pitch is automatically added to the cyclic pitch that is effected by the manual cyclic pitch control mechanism. This general object and the mechanism for attaining it will be more fully explained hereinafter.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figures 1, 2, 3, 4, 5:
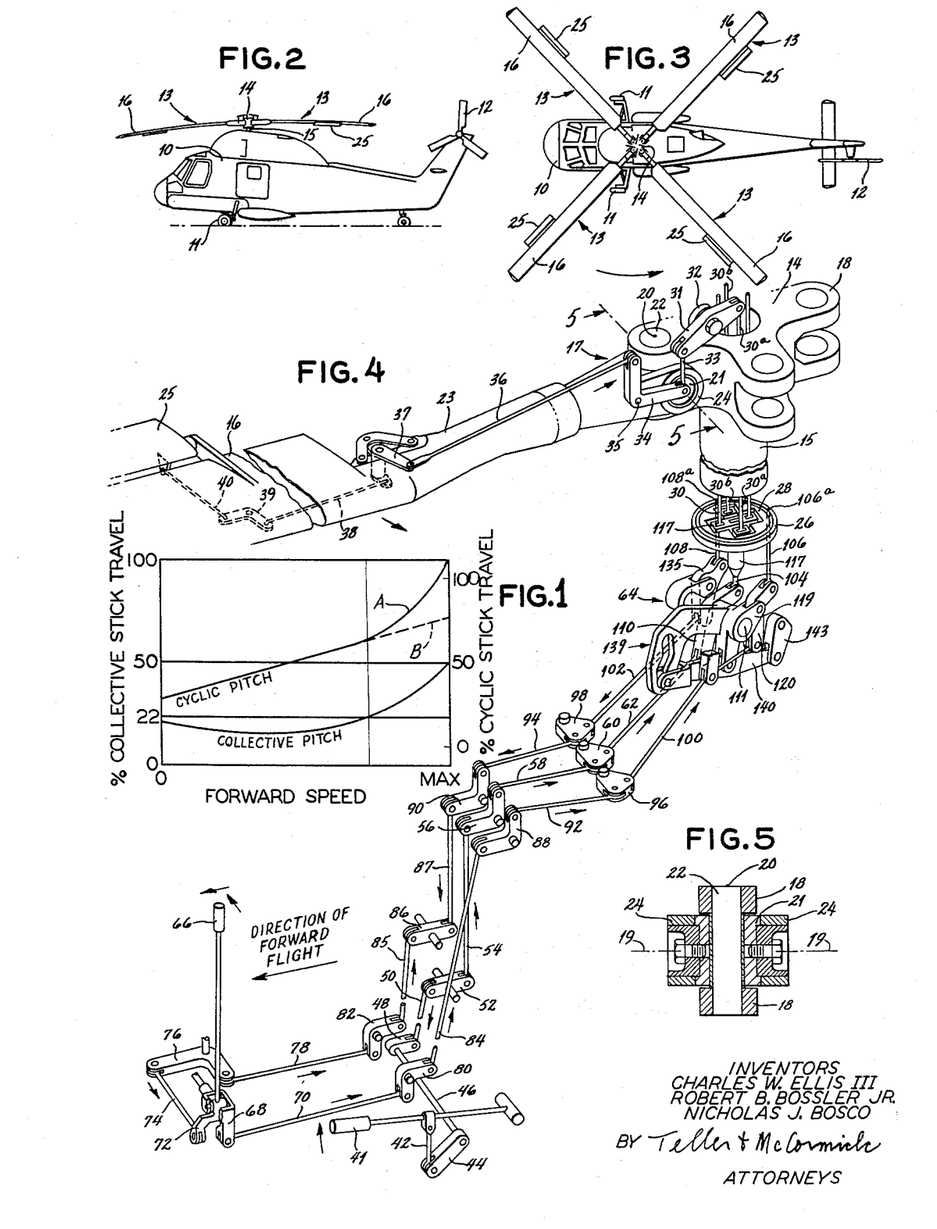
FIG. 1 is a chart showing in a very general way the required variations in collective pitches and in forward cyclic pitches as the forward speed of a helicopter increases.
FIG. 2 is a side view of a helicopter adapted for the incorporation therein of a rotor blade control system embodying the invention.
FIG. 3 is a plan view of the helicopter shown in FIG. 2.
FIG. 4 is a schematic perspective view of a pilot operable mechanism incorporating the invention.
FIG. 5 is an enlarged vertical sectional view taken along the line 5—5 of FIG. 4.

*Statement of General Objective—Fig. 1*

Referring particularly to FIG. 1 of the drawings, it will be seen that, as the forward speed of a helicopter is increased from zero to maximum, the collective pitch requirement first slightly decreases and then slightly increases. Thereafter, there is a sharp increase in the collective pitch requirement. The forward cyclic pitch requirement initially increases in approximate proportion to forward speed and it then increases at a greatly increased rate. In order to reduce the amount of attention required by the pilot and for other reasons, the mechanism embodying the invention includes means additional to the ordinary controls and dependent upon the increase in collective pitch for automatically adding a controlled amount of forward cyclic pitch to whatever cyclic pitch has been effective by said ordinary controls.

It is desirable to provide a relatively low leverage ratio between the cyclic pitch control stick and the pitch control means at the blades. This avoids the excessive pitch control sensitivity that would result from any substantially higher leverage ratio. In trying to make small cyclic trim adjustments with a high leverage ratio, the pilot would be likely to overshoot with resultant excessively severe maneuvers. But a relatively lower leverage ratio would result in a deficiency in the cyclic pitch which is required to achieve high forward speed. Additional cyclic pitch is therefore provided automatically as a function of forward speed without effecting the sensitivity of the cyclic control for trim and maneuver purposes. As stated, collective pitch varies with speed during a certain range and therefore the require additional forward cyclic pitch is provided as a function of collective pitch increases.

During an initial vertical climb or during hover, no cyclic pitch is required and such pitch might be objectionable. The mechanism of the invention therefore adds no cyclic pitch during the initial portion of collective pitch increase, which is ordinarily about 22% of the total possible increase. Forward flight within this initial range of collective pitch increase is necessarily at a relatively slow speed and there is no particular need for forward cyclic pitch additional to that provided by the ordinary manual control.

High forward speed takes place when the collective pitch increase is within the range of about 22% to about 50% of the total possible increase. It is within this range that the sharply increased forward cyclic pitch is required in approximate proportion to the increased collective pitch. In FIG. 1 the solid line A represents the movement of the cyclic stick travel that would be required to manually provide the before-mentioned sharply increased cyclic pitch. The dotted line B represents the movement of the cyclic stick travel that is required when the mechanism of the invention is provided, the increased cyclic pitch being taken care of automatically and without a correspondingly increased stick travel.

The final portion of the collective pitch increase, about 50% of the total possible increase, is employed only at altitudes where both hovering and high forward speed performance capability falls off due to power limitations. Within this range additional forward cyclic pitch is usually unimportant, and no additional cyclic pitch is automatically provided.

It will be understood that the specific percentages that have been stated are merely illustrative and that they are those found preferable for a particular helicopter. For a different helicopter, other percentages may be preferable, and the invention is not limited to those selected for illustration.

*General Organization—FIGS. 2 to 5*

Referring to the drawings, and more particularly FIGS. 2 and 3 thereof, 10 represents the fuselage of a helicopter having a rotor adapted for control by a mechanism embodying the invention, 11 represents the landing gear, and 12 represents the tail rotor. These parts can be widely varied and they do not of themselves constitute any part of the invention.

The rotor of the helicopter comprises a plurality of generally radial blades 13, 13 connected with a hub 14 and uniformly spaced about a central vertical axis. As shown, the rotor has four blades, but the invention is not necessarily so limited. The hub 14 is connected with a vertical power shaft 15 extending upwardly from the fuselage 10. Each blade 13 has an outboard lifting portion 16 and an inboard member 17, the portion 16 being rotatably movable about a radial axis for changes in blade pitch.

There may be wide variation as to the rotative connection between the lifting portion and the inboard member of each blade, and as to the connections between the inboard members and the hub. Representative connections are shown in the drawings and will be described.

When there are four blades, as shown, the hub 14 has four radial arms 18, 18 with which the inboard members 17 of the blades are respectively connected for movement about horizontal flapping axes 19 and about vertical lead-lag axes 20. As shown in FIGS. 4 and 5 each hub arm 18 is bifurcated and a pivot block 21 is located between the bifurcations. The block 21 has a vertical bearing opening therein for a pivot pin 22 which provides for pivotal movement about said lead-lag axis 20. The inboard blade member 17 has an outer tubular portion and said member is bifurcated at its inner end to provide bifurcations 24, 24 which embrace said pivot block 21. Said bifurcations 24, 24 are pivotally connected with the block for flapping movements about said axis 19.

The lifting structure 16 of each blade is carried by a supporting element 23 and the inner portion of said element is tubular and surrounds the tubular portion of the inboard member 17. Bearings (not shown) are interposed between said tubular portions and these bearings permit the outboard portion 16 of the blade to turn relatively to the inboard member 17 for effecting changes in pitch. Tension-torsion members (not shown) are provided within said tubular portions, and said members are connected at their outer ends with the outboard portion 16 and are connected at their inner ends with the inboard portion 17. Said tension-torsion members serve to prevent outward movement of the outboard blade portion and they also serve to resist rotative movement of said outboard portion.

The invention in its broader aspects is not narrowly limited as to the means for effecting and controlling the relative rotative movements of the portions 16, 16. However, such rotative movements are preferably effected and controlled by means of aerodynamic servo-flaps 25, 25 carried by the respective outboard lifting portions and adjustable relatively thereto about axes parallel with said radial axes. Mechanism controlled or actuated by the pilot is provided for moving and controlling the flaps 25, 25 so as to change and maintain the blade pitches for all conditions of flight.

*Pilot Operated Pitch Control Mechanisms—FIG. 4*

Two pilot operable mechanisms are provided on the fuselage for effecting changes in the pitches of the several rotor blades, the first mechanism serving for effecting collective pitch changes and the second serving for effecting cyclic pitch changes. The two mechanisms have various parts in common as will presently appear. When flaps such as 25, 25 are provided for changing the blade pitches, said pilot operable mechanisms are connected with said flaps. The major portions of said pilot operable mechanisms are shown schematically in FIG. 4. These mechanisms have certain parts in common as will presently be apparent. Portions of the mechanisms to which the invention more particularly relate are shown in FIGS. 6 to 13.

The two pilot operable mechanisms are connected with mechanisms on the several blades 13, 13 for changing and maintaining the pitches thereof. As shown in FIG. 4, the last said mechanisms serve to change and maintain the pitches of the blades by means of flaps such as 25, 25. Certain portions of the pilot actuated and other mechanisms as shown in FIG. 4 are merely illustrative and any other suitable mechanism portions may be substituted.

The pilot operable mechanisms as shown in FIG. 4 include an azimuth assembly which is common to both mechanisms and is located at or near the bottom of the shaft 15 which shaft is hollow. The azimuth assembly includes a nonrotatable azimuth ring 26 and also includes swash plate 28 which is rotatable about an axis in fixed relationship to the ring. The azimuth assembly is adjustable vertically and it is also adjustable to angularly change the position of the axis of rotation of the swash plate. When the assembly is positioned with the ring 26 horizontal, or perpendicular to the axis of the shaft, the axis of rotation of the swash plate 28 is coincident with the shaft axis.

When there are four blades there are four vertical rods 30, 30 which are located within the shaft 15 and which are pivotally connected at their lower ends to the swash plate 28. Each of the rods 30, 30 is connected at its upper end with mechanism for angularly moving the flap 25 of the corresponding blade.

The details of the connections from the rods 30 to the flaps 25 are not part of the present invention and these details can be widely varied. As shown, each rod 30 is pivotally connected at its upper end with the inner end of a corresponding lever 31 which is horizontally pivoted between its ends to a fixed support 32 on the hub 14. The lever 31 is connected at its opposite or outboard end with the upper end of a corresponding link 33. The lower end of each link 33 is connected with one arm of a corresponding bell crank 34 movable about a horizontal axis at 35 in fixed relation with the inboard member 17 of the corresponding blade. An actuating element or link 36 is connected with the other arm of the bell crank 34 and extends radially outwardly. The link 36 is connected with a lever 37 and a link 38 extends outwardly from the lever. Carried by the lifting portion 16 of the blade is a bell crank 39 to one arm of which the link 38 is connected. The other arm of the bell crank 39 is connected with the leading end of a transverse link 40, the trailing end of the link 40 being connected with a depending horn on the flap 25. FIG. 4 shows only the flap moving parts that are connected with one rod 30, the corresponding parts connected with the other rods being omitted for simplicity of illustration.

The first pilot operable mechanism for effecting collective increases or decreases in the pitches of the several rotor blades includes a collective control member or stick 41 and also includes means connected with the stick for moving the azimuth assembly vertically for collective changes in the pitches of the blades. As shown, the stick 41 is pivotally movable in a vertical longitudinal plane, and it is so movable rearwardly and upwardly or forwardly and downwardly. For convenience, said stick will be referred to as movable rearwardly and forwardly. Said stick 41 is connected by means of a link 42, an arm 44, a shaft 46 and an arm 48 with an approximately vertical link 50. The link 50 is connected with a lever 52 which is pivoted between its ends, the lever in turn being connected with a link 54 which is moved upwardly and downwardly when the stick is moved rearwardly and forwardly.

The link 54 is connected with a bell crank 56 which in turn is connected with a rearwardly extending longitudinal link 58. The link 58 is connected with an arm 60 which is pivoted for movement about a vertical axis. The last said arm is connected with a horizontal link 62 which extends rearwardly and laterally at an angle of 45°. The link 62 is connected with a mechanism to which the invention more particularly relates, this mechanism being generally indicated at 64 in FIG. 4, and being fully shown in FIGS. 6 to 13. The mechanism 64 is to some extent common to the two pilot operable mechanisms, one for collective pitch control and one for cyclic pitch control.

The second pilot operable mechanism for effecting cyclic changes in the pitches of the several blades includes a cyclic control member or stick 66 and also includes means connected with the stick for moving the azimuth assembly angularly for cyclic changes in the pitches of the blades. The stick 66 is movable in any horizontal direction, that is, forwardly or rearwardly or transversely in either direction. Longitudinal movements of the stick serve by means of an arm 68 to longitudinally move a connected longitudinal link 70. The link 70 is moved rearwardly when the stick 66 is moved forwardly and is moved forwardly when the stick is moved rearwardly. Lateral movement of the stick 66 serves by means of an arm 72, a link 74 and a bell crank 76 to longitudinally move a connected longitudinal link 78 which is parallel with the link 70. The link 78 is moved rearwardly when the stick 66 is moved toward the right and is moved forwardly when the stick 66 is moved toward the left.

The links 70 and 78 are connected respectively with bell cranks 80 and 82 which in turn are connected respectively with approximately vertical links 84 and 85 located adjacent the links 50 and 54. The link 85 is connected with a lever 86 which is pivoted between its ends, the lever being connected in turn to a link 87. The links 84 and 87 are connected respectively with bell cranks 88 and 90 which are at opposite sides of the bell crank 56 and are connected respectively with rearwardly extending longitudinal links 92 and 94. The links 92 and 94 are connected respectively with arms 96 and 98 which are pivoted for movement about vertical axes and are at opposite sides of the arm 60. Said arms 96 and 98 are connected respectively with horizontal links 100 and 102 which extend rearwardly and laterally at an angle of 45°, these links being at opposite sides of the link 62. The links 100 and 102 are connected with the before-mentioned mechanism 64 to which the invention more particularly relates. The mechanism 64 serves to transmit motion from the link 62 of the collective pitch mechanism to a vertical link 104 which moves the azimuth assembly upwardly and downwardly, and the mechanism 64 also serves to transmit motion from the links 100, 102 of the cyclic pitch mechanism to vertical links 106, 108 which control angular movements of the azimuth assembly.

*Pitch Control Mechanism—FIGS. 6 to 13*

The mechanism 64 shown generally in FIG. 4 and shown in detail in FIGS. 6 to 12, comprises a main supporting frame 109 mounted in a fixed position, this frame serving to support all movable parts of the mechanism.

In the description that follows, all references to forward and rearward and lateral directions and movements are intended to designate such directions and movements with respect to the fuselage of the helicopter and not necessarily with respect either to free air or to the direction of helicopter movement. As viewed in FIG. 4, the forward direction is that of the arrow marked "Direction of Forward Flight."

Figure 6:
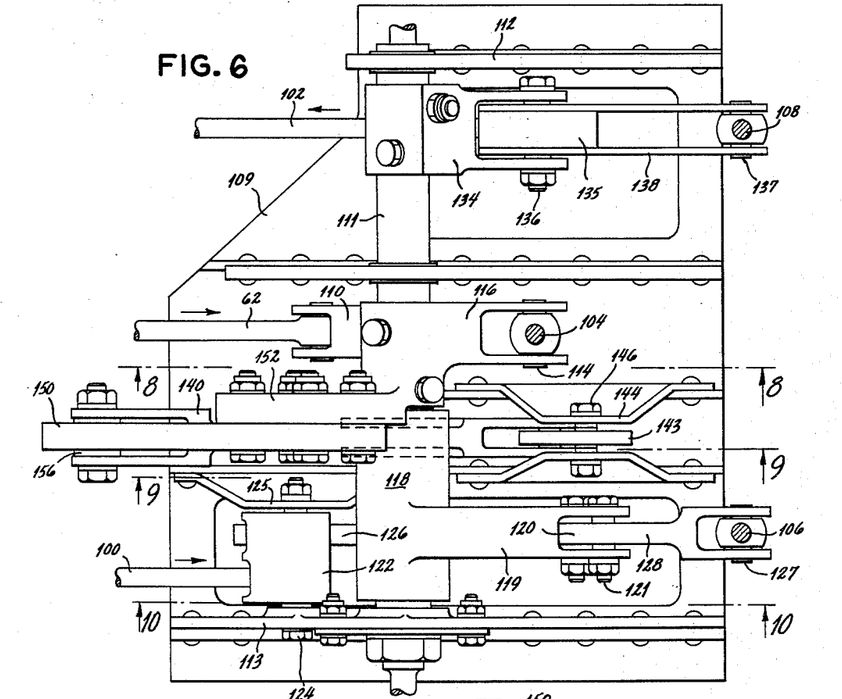
FIG. 6 is an enlarged plan and sectional view taken along the line 6—6 of FIG. 4.
Figure 7:
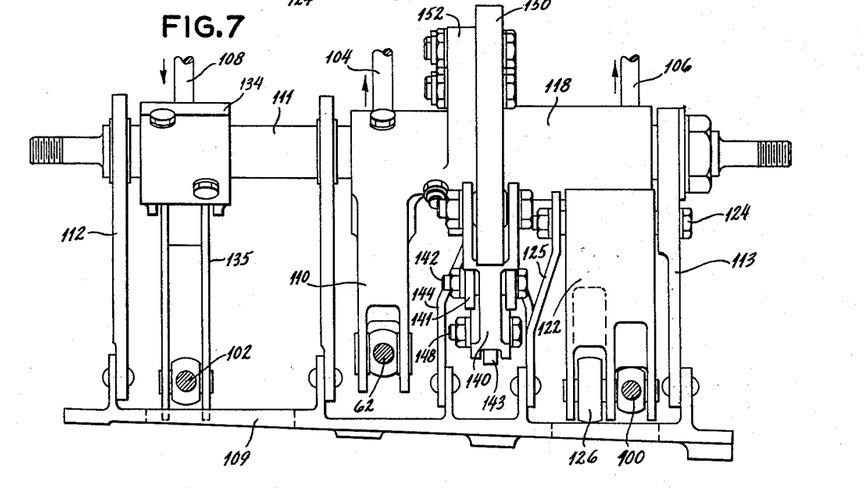
FIG. 7 is a front view of the mechanism shown in FIG. 6.

Referring to FIG. 4 and also and more particularly to FIGS. 6 and 7, the link 62 is connected with one arm of a bell crank 110 movable about a horizontal axis. As shown, the bell crank is secured to the central portion of a rotatively movable rockshaft 111, the pivotal axis of the bell crank being the axis of the shaft. Said shaft 111 is suitably mounted in side plates 112 and 113 in the frame 109. The shaft 111 is perpendicular to the links 62, 100 and 102 and is therefore at an angle of 45° with respect to longitudinal lines. The before-mentioned vertical link 104 is connected at 114 with the other arm or lever 116 of the bell crank 110, this link being concentric with the axis of rotation of the main shaft 15 and being connected with a vertically movable support 117 for the rotatable swash plate 28 which in turn supports the azimuth ring 26. The axis of rotation of the swash plate 28 is angularly adjustable with respect to the support 117, this angular adjustment being effected by the ring 26.

The approximately horizontal arm 116 of the bell crank 110 is sometimes hereinafter referred to as a horizontal first lever movable about a horizontal axis which axis is that of the shaft 111. The link 104 for moving the azimuth assembly upwardly or downwardly is sometimes hereinafter referred to as the first azimuth link.

A hub 118 is carried by the shaft 111 on the left portion thereof, but said hub is rotatable relatively to said shaft. The hub is not freely movable relatively to the shaft and its movements are controlled as hereinafter described. The hub 118 has an integral rearwardly extending supporting arm 119, and a bell crank 120 is carried by the arm 119 for movement about a horizontal pivotal axis at 121, this bell crank having a downwardly extending arm which is connected, at least indirectly, with the link 100. As shown, the link 100 is connected indirectly with the bell crank 120. A lever 122 is pivoted at 124 on the side plate 113 and on a sheet metal support 125, and the link 100 is connected with this lever. A link 126 connects the lever 122 with the bell crank 120. The before-mentioned vertical link 106 is connected at 127 with the rearwardly extending arm or lever 128 of the bell crank 120. The upper end of the link 106 is connected with the azimuth ring 26 at a point 106ᵃ which is at the front or rear, specifically at the rear, so that upon vertical movement of the link the axis of rotation of the swash plate is inclined longitudinally to effect either forward cyclic pitch or rearward cyclic pitch.

Mechanism hereinafter described in detail is provided for moving the bell crank 120 and the link 106 bodily upwardly and downwardly in accordance with and to the same extent as the upward and downward movements of the link 104. The link 126 is relatively short so that as the bell crank is moved upward and downward the link 126 will tend to rotate the bell crank about its pivot axis and thereby tend to move the link 106 to a greater or lesser extent than the extent of the corresponding movement of the link 104. However, provision is made to compensate for this effect of the link 126 as hereinafter explained.

The approximately horizontal arm 128 of the bell crank 120 is hereinafter sometimes referred to as a horizontal second lever movable about a horizontal axis, the axis being that at 121. The link 106 is sometimes hereinafter referred to as the second azimuth link.

Secured to the shaft 111 at the right portion thereof is a rearwardly extending second supporting arm 134. A bell crank 135 is carried by the arm 134 for movement about a horizontal axis at 136, this bell crank having a downwardly extending arm which is connected with the link 102. The beforementioned vertical link 108 is connected at 137 with the rearwardly arm or lever 138 of the bell crank 135. The upper end of the link 108 is connected with the azimuth ring 26 at a point 108ᵃ which is at one side thereof, specifically at the right side so that the axis of rotation of the swash plate is inclined laterally to effect either rightward cyclic pitch or leftward cyclic pitch.

The pivotal axis 136 of the bell crank 135 is spaced rearwardly from the shaft 111 to the same extent as is the axis 114 for the link 104. As shown, the axes are at the same level and are coincident, but this is not essential. From the foregoing it will be evident that said axis at 136 and said bell crank 135 and said link 108 move bodily upwardly and downwardly in unison with said link 104 and with the azimuth assembly. The link 102 is approximately horizontal and therefore the relative motions transmitted to the vertical link 108 and to the azimuth ring for effecting cyclic pitch changes are not materially affected by the vertical movement of the azimuth assembly by the link 104.

The approximately horizontal arm 138 of the bell crank 135 is sometimes hereinafter referred to as a horizontal third lever movable about a horizontal axis, the axis being that at 136. The link 108 is sometimes hereinafter referred to as the third azimuth link.

*Explanation of Manner of Operation Without Regard to Present Invention*

The stick or member 41 of the pilot operable collective pitch mechanism can be moved rearwardly to increase collective pitch and it can be moved forwardly to decrease collective pitch. When said member is moved rearwardly, the link 50 is moved downwardly, the link 54 is moved upwardly, the link 58 is moved rearwardly, the link 62 is moved rearwardly and rightwardly and the link 104 is moved upwardly. Thus, the entire azimuth assembly is moved upwardly to move all of the rods 30, 30 upwardly. These rods act through the described parts to adjust the flaps 25, 25 in such manner that the pitches of all of the blades are collectively increased. It will be obvious that when the stick or member 41 is moved forwardly the several described motions are reversed and the blade pitches are collectively decreased.

The stick or member 66 of the pilot operable cyclic pitch mechanism can be moved forwardly or rearwardly or rightwardly or leftwardly to cause the helicopter to move in any direction, the direction of movement being the same as that of the stick.

When the stick 66 is moved rightwardly, the link 78 is moved rearwardly, the link 85 is moved upwardly, the link 87 is moved downwardly, the link 94 is moved forwardly, the link 102 is moved forwardly and leftwardly and the link 108 is moved downwardly. Thus, the azimuth assembly is tilted downwardly at the right and upwardly at the left, so that during rotation of the swash plate 28 the rods 30, 30 are moved upwardly and downwardly. In so moving, the rods act through the described parts 31, 33, 34, 36, 37, 38, 39 and 40 on the several blades to adjust the flaps 25, 25 so as to produce the required cyclic pitch changes.

Referring particularly to the upper portion of FIG. 4, it will be understood that the rotor is rotating in the counterclockwise direction and that the blade controlled by the illustrated parts is extending directly forwardly. It will be assumed that the cyclic pitch stick has been moved toward the right as above stated and that the azimuth assembly has been tilted downwardly at the right and upwardly at the left. When the blade extends forwardly, as shown, the rod 30ᵃ which controls the flap 25 for said blade is positioned at the left. With the azimuth assembly tilted upwardly at the left, the rod 30ᵃ at the left has been moved upwardly and the flap on the forwardly extending blade has been moved for the maximum blade pitch corresponding to the selected position of the stick 66. There is a lag of approximately 90° in the upward movement of the blade about its horizontal tilting axis and the blade shown at the front therefore attains its maximum upward flapping deflection about midway of its repeating movement. At the same time, the rod 30ᵇ, which is at the right and opposite the rod 30ᵃ, has been moved downwardly and the flap on the opposite or rearwardly extending blade, not shown, has been moved to provide the minimum blade pitch corresponding to the selected position of the stick 66. As the result of the said lag the blade that was at the rear attains its maximum downward flapping deflection midway of its advancing movement. Thus, there is a rotor disc tilt in the same direction as the tilt of the azimuth assembly and the helicopter is caused to move laterally toward the right. It will be obvious that when the stick 66 is moved laterally toward the left the several last described motions are reversed so that the cyclic pitch changes would tend to cause the helicopter to move toward the left.

When the cyclic pitch stick 66 is moved forwardly, the link 70 is moved rearwardly, the link 84 is moved upwardly, the link 92 is moved rearwardly, the links 100 and 126 are moved rearwardly and rightwardly and the link 106 is moved upwardly. Thus, the azimuth assembly is tilted forwardly. The rods 30, 30 and the associated parts are moved as before described, but they are differently timed to produce cyclic pitch changes which provide maximum pitch for each blade when it is retreating and to provide minimum pitch for each blade when it is advancing. This action causes a rotor disc tilt in the same direction as the tilt of the azimuth assembly, that is, in the forward direction, and the helicopter is caused to move forwardly. Except for timing, the action is the same as described in connection with movement of the stick 66 toward the right. It will be obvious that when the stick 66 is moved rearwardly there is a reversal of the several motions described in connection with forward stick movement with the result that the cyclic pitch changes would cause the helicopter to move rearwardly. Pitch changes which tend to tilt the rotor disc in the forward or rearward direction are referred to as longitudinal cyclic pitch changes, and those which tend to tilt the rotor disc to the right or left are referred to as lateral cyclic pitch changes.

*The Specific Mechanism of the Invention—FIGS. 6 to 13*

It is pointed out that, merely for convenience of illustration, all of the various parts are shown in FIGS. 6 to 13 as being in the positions corresponding to a central or neutral position of the cyclic pitch stick 66. However, it will be understood that there is ordinarily a substantial forward longitudinal cyclic pitch established by the stick 66. Except in FIGS. 12 and 13, all of the various parts are shown in positions corresponding to the forward minimum pitch position of the collective pitch stick 41. The various arrows indicate directions of movement of the various links as the stick 66 is moved toward the right and as the stick 41 is moved rearwardly.

As previously stated, provision is made for moving the axis 121 and the bell crank 120 upwardly and downwardly in accordance with the upward and downward movements of the link 104 and of the azimuth assembly for changing collective pitch. In its more specific aspects, the invention relates to means automatically operable under hereinafter stated circumstances for vertically moving the axis 121 and the bell crank 120 and the link 106 to an extent greater than the extent of vertical movements of the azimuth assembly so as to increase forward cyclic pitch.

As has been pointed out, the bell crank 120 for the link 106 is carried by a supporting arm 119 on the hub 118, said hub being relatively movable on the shaft 111. Mechanism is provided for turning the hub 118 relatively to the shaft 111 and for thereby bodily moving the bell crank 120 and the link 106, said mechanism being dependent upon rotative movement of the bell crank 116 with corresponding upward movement of the link 104. This mechanism includes a cam 139 connected to the bell crank 116 and it includes means controlled by the cam for moving the supporting arm 119 to vertically move the bell crank 120. The last said means preferably includes a cam follower having engagement with the cam 139 and it includes a link or beam 140 connected with the hub 118 by means of an integral actuating arm 141 on said hub. The beam is pivotally connected with the arm 141 at 142. As shown, the beam 140 is located below the shaft 111 and it extends generally horizontally, but this particular location of the beam is not essential.

A means is provided for preventing the beam 140 from freely pivoting about the axis 142 and as shown this means is a link 143. This link is pivoted at its upper end to a support structure 144 on the main frame 109 for movement about a fixed axis at 146, and it is pivoted at its lower end at 148 to the beam 140 at the rear end of the latter. The spacing between the axes 146 and 148 is approximately the same as that between the shaft axis and the axis 142. The beam 140 is therefore movable forwardly and rearwardly in approximate parallelism.

The before-mentioned cam 139 serves to effect forward and rearward movement of the beam 140. Said cam includes a plate 150 connected with the bell crank 110. As shown, the bell crank 110 has an integral flange 152 to which the cam plate 150 is bolted. The cam plate has a slot 154 therein, this slot being shaped to constitute a cam path. The beam 140 is bifurcated at its forward end and the cam follower is in the form of a roller 156 and is rotatably mounted between the bifurcations. The roller is of such size that it fits the cam slot 154 with a very small working clearance. The cam slot preferably has three distinct portions 158, 160 and 162.

Figure 9:
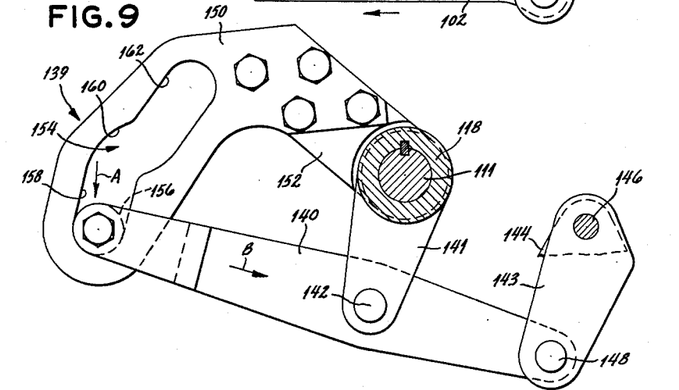
FIG. 9 is a view similar to FIG. 8, but taken along the lines 9—9 of FIGS. 6 and 7, this view omitting certain parts that are shown in FIG. 8.
Figure 11:
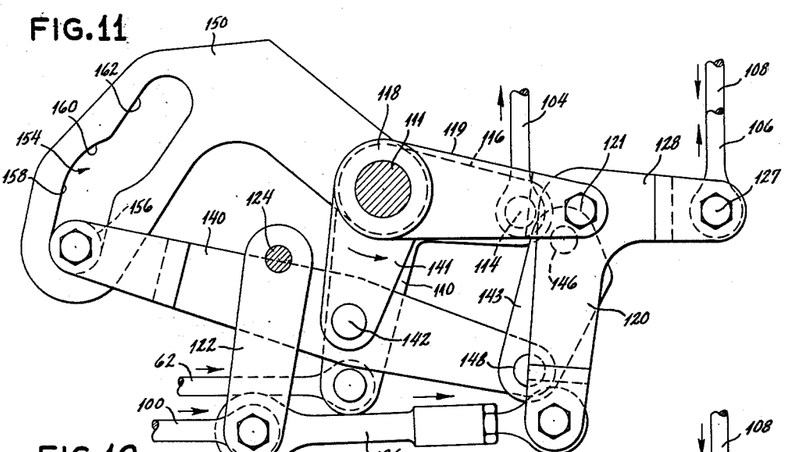
FIG. 11 is a schematic view of the movable parts that are shown in FIGS. 9 and 10, the several parts being shown in the positions for minimum collective pitch.

When the parts are in the positions shown in FIGS. 9 and 11, the collective pitch in minimum, and the cam 139 is in its upper position with the follower 156 in the lowermost part of the cam portion 158. The beam 140 is held in its foremost position and it acts through the arms 141 and 119 to hold the axis 121 and the bell crank 120 in their lowermost positions. The lowermost position of the axis 121 is shown as being at the same level as that of the lowermost positions of the axes 114 and 127. However, the exact level is not essential.

Figures 12, 13:
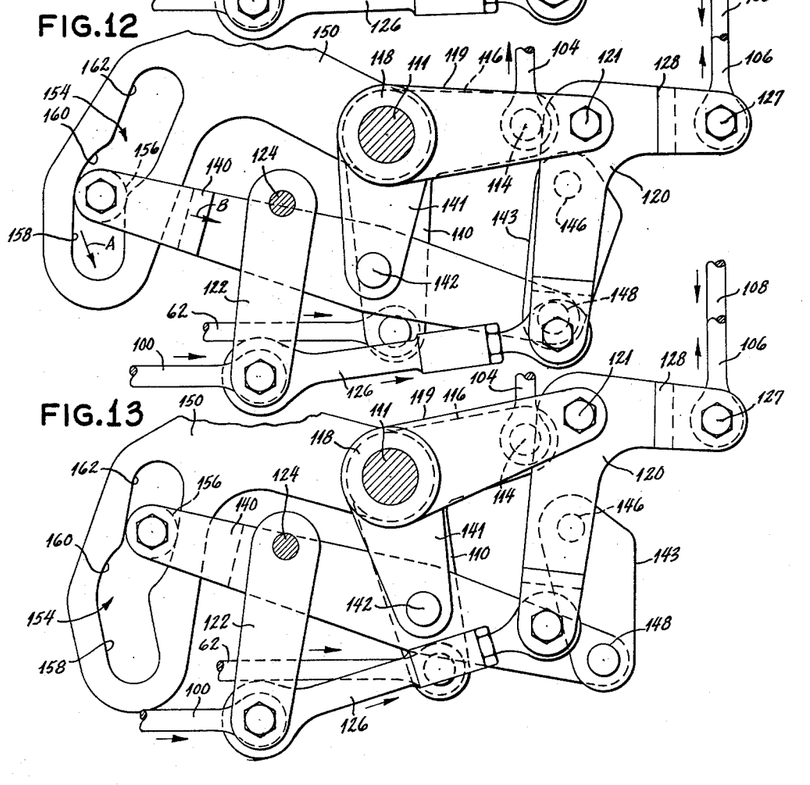
FIG. 12 is a view similar to FIG. 11, but showing the parts in the positions for somewhat increased collective pitch.
FIG. 13 is a view similar to FIGS. 11 and 12, but showing the parts in the positions for additionally increased collective pitch.

When the bell crank 110 is moved counterclockwise by the link 62 so as to collectively increase the blade pitches, the cam plate 150 is moved downwardly from the FIG. 11 position to the FIG. 12 position as indicated by arrow A. The shape of the lower cam portion 158 is such that the beam 140 is moved rearwardly, as is indicated by the arrow B. Rearward movement of the beam 140 turns the arms 141 and 119 so that the axis 121 and the bell crank 120 move upwardly at the same rate as that of the upward movement of the bell crank axis 114. As mentioned previously, the shortness of the link 126 makes it tend to rotate the bell crank 120 as the latter is moved upwardly and downwardly so as to move the link 106 at a different rate than the link 106 and this has been taken into account and compensated for in the designing of the cam. The maintained relationship will be evident by comparing FIG. 12 with FIG. 11. So long as the cam follower 156 remains in engagement with the lower portion 158 of the cam slot, said axis is at 121 and said bell crank 120 moves upwardly and downwardly in unison with said link 104 and with the azimuth assembly.

During this initial movement, which is about 22% of the total, the cam mechanism does not in any way modify the cyclic pitch pattern controlled by the links 100 and 102.

In this last-mentioned period, as previously explained, forward flight is necessarily at a slow speed and there is no particular need for forward cyclic pitch additional to that provided by the ordinary manual control.

When the parts are moved beyond the FIG. 12 position for additional collective pitch increases, the cam follower 156 enters the inclined intermediate portion 160 of the cam slot and the beam 140 is moved more additionally rearwardly so as to move the axis 121 and the bell crank crank 120 upwardly at an increased rate. Thus, the link 106 is moved additionally upwardly irrespective of any movements or positions imparted by the links 100 and 126. This increased upward movement of the axis 121 and of the bell crank 120 and of the link 108 are continual until the follower reaches the end of the inclined cam portion 160 as shown in FIG. 13. During the last said upward movement, which is about 28% of the total movement, an additional forward cyclic pitch is superimposed upon the before described cyclic pitch pattern controlled by the links 100 and 102.

The relative upward movement of the link 106 can be observed by comparing FIG. 13 with FIG. 12. In FIG. 12 the axis 127 is at about the same level as the axis 114, but in FIG. 13 the axis 127 is considerably higher. As shown in these views, there is no cyclic pitch established by the stick 66 and its associated parts. However, for forward flight there would ordinarily be a forward cyclic pitch pattern established by the stick 66, and the axis 127 would be at a level higher than that shown.

It is in this last-mentioned range, as previously explained, that added forward cyclic pitch is required in approximate proportion to the increased collective pitch.

When the parts are moved beyond the FIG. 13 position, the cam follower 156 is in the upper portion 162 of the cam slot. The shape of the last said portion of the cam slot is similar to that of the portion 152 and it is such that the rearward movement of the beam 140 moves the arms 141 and 119 so that the axis 121 and the bell crank 120 and the axis 127 move upwardly at the same rate as that of the upward movement of the bell crank axis 114. The relationship shown in FIG. 12 is approximately maintained. During this final movement, which is about 50% of the total, the cam does not in any way modify the cyclic pitch pattern controlled by the links 100 and 102 and supplemented by the additional forward cyclic pitch introduced by the cam portion 160.

As previously explained, additional forward cyclic pitch during this final range is not needed and would not be useful.

It will be understood that reverse movement of the several parts serves to reverse the described sequence of steps and to eliminate said superimposed cyclic pitch changes.

It will be apparent that the described movements of the axis 121 and of the bell crank 120 which are effected by the cam 139 do not in any way interfere with nor affect the normal cyclic pattern controlled by the stick 66. The additional forward cyclic pitch in merely superimposed upon the normal cyclic pitch pattern.

Figure 8:
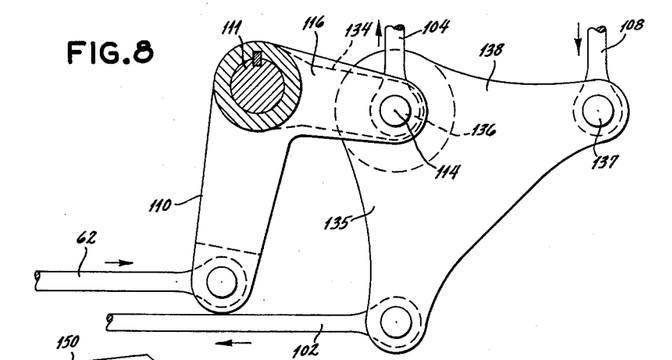
FIG. 8 is a simplified vertical sectional view taken along the lines 8—8 of FIGS. 6 and 7, this view showing movable parts behind the plane of the section but omitting various parts of the supporting structure.
Figure 10:
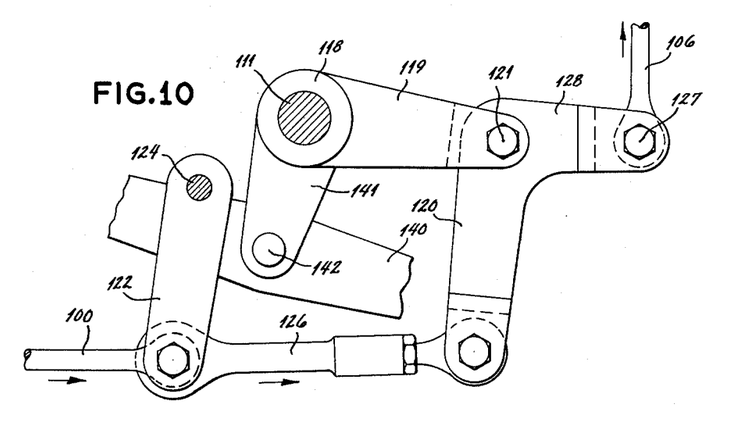
FIG. 10 is a view similar to FIGS. 7 and 8 but taken along the lines 10—10 of FIGS. 6 and 7, this view omitting certain parts that are shown in FIGS. 7 and 8.

Referring particularly to FIGS. 4, 8 and 10, it will be observed that the links 100 and 102 respectively effect longitudinal cyclic pitch and lateral cyclic pitch, and that these links are movable to equal extents. The arms of the bell crank 135 for effecting lateral cyclic pitch are about equal in length and the link 108 is moved to the full extent of the movement of the link 102. However, the bell crank 120 for effecting longitudinal cyclic pitch has unequal arms and the link 106 is moved to a lesser extent than the link 100. It will therefore be evident that the azimuth mechanism cannot be tilted longitudinally to its maximum extent by this stick 66, and that a portion of the tilting range is reserved for the additional tilting that is effected by the cam 139 and its associated parts.

The invention claimed is:

1. For use in a helicopter provided with a multibladed lifting rotor and normally movable in a forward longitudinal direction, a pitch control mechanism comprising in combination:

first and second pilot operable members, first means associated with said first pilot operable member for collectively increasing or decreasing the pitches of the several rotor blades in response to movement of said first pilot operable member in predetermined opposite directions, second means associated with said second pilot operable member for changing the pitches of the several rotor blades in a longitudinal cyclic manner in response to movement of said second pilot operable member in predetermined opposite directions, and means associated with said first pilot operable member and effective throughout at least a portion of the range of travel of said first member in said predetermined opposite directions for changing the pitches of the several rotor blades in a longitudinal cyclic manner which pitch changes are superimposed upon any longitudinal cyclic pitch pattern effected by said second pilot operable member.

2. A pitch control mechanism as set forth in claim 1, wherein said means for effecting superimposed longitudinal cyclic pitch changes is ineffective to produce such superimposed changes during an initial portion of the collective pitch increasing movement of said first pilot operable member and is effective to produce such superimposed changes during a subsequent portion of the last said movement.

3. A pitch control mechanism as set forth in claim 1, wherein said means for effecting superimposed longitudinal cyclic pitch changes is effective to produce such superimposed changes during a portion of the collective pitch increasing movement of said first pilot operable member and to be ineffective to produce such superimposed changes during a subsequent portion of the last said movement.

4. A pitch control mechanism as set forth in claim 1, wherein said means for effecting superimposed longitudinal cyclic pitch changes is ineffective to produce such superimposed changes during an initial portion of the collective pitch increasing movement of said first pilot operable member and to be effective to produce such superimposed changes during an intermediate portion of the last said movement and to be again ineffective to produce such superimposed changes during a final portion of the last said movement.

5. A pitch control mechanism as set forth in claim 4, wherein said initial and intermediate and final portions of the total collective pitch increasing movement of said first member are respectively approximately 30% thereof and 30% thereof and 40% thereof.

6. For use in a helicopter provided with a multibladed lifting rotor and normally movable in a forward longitudinal direction, a pitch control mechanism comprising in combination:

a pitch changing mechanism associated with the several blades of said rotor and including input members movable in one manner to collectively change the pitches of said blades and movable in a second manner to change the pitches of said blades in a longitudinal cyclic manner, first and second pilot operable members each movable in predetermined opposite directions over first and second ranges of travel respectively, means connected between said first pilot operable member and said input members for moving said input members to effect collective pitch changes in response to movement of said first pilot operable member throughout any portion of the said range of travel, means connected between said second pilot operable member and said input members for moving said input members to effect longitudinal cyclic pitch changes in response to movement of said second pilot operable member throughout any portion of its said range of travel, and means connected between said first pilot operable member and said input members for moving said input members to effect longitudinal cyclic pitch nges only in response to movement of said first pilot operable member throughout a predetermined portion of its range of travel which predetermined portion is less than its full range of travel and which latter pitch changes are superimposed on the longitudinal cyclic pitch changes effected by movement of said second pilot operable member.

7. A lifting rotor and pitch control mechanism for use in a helicopter normally movable in a forward direction, the combination of:

a rotatable hub, a plurality of similar radially extending blades each including an inboard portion connected with the hub and held to prevent turning movement about a radial axis and each also including an outboard airfoil lifting portion connected with said inboard portion for limited turning movement about said radial axis, a plurality of similar airfoil flaps carried respectively by said lifting portions and pivotally movable relatively thereto about axes substantially parallel with said radial axes, a plurality of mechanisms on the several blades for pivotally moving the several flaps relatively to their respective lifting portions so as to enable said flaps to act aerodynamically during rotor rotation to turn the respective lifting portions about said radial axes and to thereby change the effective pitches of said lifting portions, a first pilot operable mechanism for simultaneously moving all of the blade flaps to effect collective increases or decreases in the blade pitches, a second pilot operable mechanism for moving said flaps to effect cyclic changes in the pitches of the several blades which last said mechanism is operable to vary the timing of said cyclic pitch changes in such a manner as to tend to cause helicopter movement in any horizontal direction, and mechanism operably dependent upon movement of the first pilot operable mechanism in the collective pitch increasing direction and effective during at least a portion of such movement to effect longitudinal cyclic pitch changes which are superimposed upon any cyclic pitch pattern effected by the second pilot operable mechanism, said operably dependent mechanism being reversably operable to eliminate said superimposed longitudinal cyclic pitch changes during movement of the first pilot operable mechanism in the collective pitch decreasing direction.

8. For use in a helicopter provided with a multi-bladed lifting rotor and normally movable in a forward longitudinal direction, a pitch control mechanism comprising in combination:

an azimuth assembly including a nonrotatable azimuth ring, a swash plate rotatable about an axis in fixed relation to the ring and normally coincident with the rotor axis which azimuth assembly is movable vertically and angularly in any direction, connections between the swash plate and the several blades for effecting collective changes in the pitches of the blades when the azimuth assembly is moved vertically and for effecting cyclic changes in the pitches of the blades when the azimuth assembly is moved angularly, a first pilot operable mechanism operable to effect upward and downward vertical movements of the azimuth assembly for effecting collective increases or decreases in the blade pitches, a second pilot operable mechanism operable to effect angular movement of the azimuth assembly in any direction for effecting cyclic pitch changes of the blades tending to cause helicopter movement in any horizontal direction, and mechanism dependent upon vertical movement of the azimuth assembly in the upward direction for effecting angular movement thereof in the direction to effect forward longitudinal cyclic pitch changes which last said angular movement is superimposed upon any angular movement thereof effected by the second pilot operable mechanism, said operably dependent mechanism being reversely operable to effect reversed angular movement of said assembly during vertical movement of the azimuth mechanism in the downward direction.

9. For use in a helicopter provided with a multi-bladed lifting rotor and normally movable in a forward longitudinal direction, a pitch control mechanism comprising in combination:

an azimuth assembly including a nonrotatable azimuth ring and also including a swash plate rotatable about an axis in fixed relation to the ring and normally coincident with the rotor axis, connections between the swash plate and the several rotor blades for effecting pitch changes when the azimuth assembly is moved, a first pilot operable member movable longitudinally in either direction, an approximately horizontal first lever pivotally movable about a horizontal axis and connected with said first member to be moved thereby, a first azimuth link connected with said first lever and serving upon pivotal movement thereof to move said azimuth assembly upwardly or downwardly for increasing or decreasing collective pitch, a second pilot operable member movable longitudinally in either direction or laterally in either direction, approximately horizontal second and third levers pivotally movable about horizontal axes and connected with said second pilot operable member to be moved thereby, said second lever being moved in accordance with longitudinal movements of the last said member and said third lever being moved in accordance with lateral movements of the last said member, a second azimuth link connected with said second lever and serving upon pivotal movement thereof to angularly move said azimuth assembly in the direction for effecting longitudinal cyclic pitch changes corresponding to the direction of longitudinal movement of said second pilot operable member, a third azimuth link connected with said third lever and serving upon pivotal movement thereof to angularly move said azimuth assembly in the direction for effecting lateral cyclic pitch changes corresponding to the direction of lateral movement of said second pilot operable member, and means operably connected with said first lever for causing bodily upward or downward movements of the second lever and the second azimuth link in accordance with upward or downward pivotal movements of said first lever but at a rate greater than the rate of upward and downward movements of the azimuth assembly by the first azimuth link, the last said means serving to angularly move said azimuth assembly so as to effect forward longitudinal cyclic pitch changes which vary directly with the increases or decreases in collective pitch and which are superimposed upon any cyclic pitch pattern that is otherwise effected by said second pilot operable member and by said second and third levers.

10. The combination in a pitch control mechanism as set forth in claim 9, wherein there is provided a supporting arm pivotally movable about an axis substantially coincident with that of the first lever, wherein said second lever is pivotally connected with said supporting arm to be supported thereby, and wherein a connection is provided between said first lever and said supporting arm for moving said arm about its pivotal axis at such a rate that the second lever and second link are moved bodily upwardly and downwardly at the aforesaid greater rate so as to effect said superimposed forward longitudinal cyclic pitch changes.

11. The combination in a pitch control mechanism as set forth in claim 10, wherein said connection between said first lever and said supporting arm is constructed and arranged to move said arm at an angular rate that is greater than the angular rate of movement of said first lever.

12. The combination in a pitch control mechanism as set forth in claim 11, wherein said connection between said first lever and said supporting arm includes a cam connected with said first lever for movement therewith and also includes a cam follower engaging said cam connected with said supporting arm for moving said arm at said greater angular rate.

13. The combination in a pitch control mechanism as set forth in claim 12, wherein said cam is shaped to cause the follower to angularly move said supporting arm at successively different angular rates, said supporting arm during its lower rate of angular movement serving to move the second lever and the second link bodily upwardly and downwardly at the same rate as that of the upward and downward movements of the azimuth assembly by the first lever and said first link and said supporting arm during its higher rate of angular movement serving to move the second lever and the second link bodily upwardly and downwardly at a rate greater than that of the upward and downward angular movements of the azimuth assembly by said first lever and said first link.

14. The combination in a pitch control mechanism as set forth in claim 12, wherein there is provided an actuating arm rigidly connected with said supporting arm, and wherein there is provided a beam which is pivotally connected with said actuating arm and which carries said cam follower, said beam serving in conjunction with the cam and the cam follower to act upon said actuating arm for angularly moving the supporting arm.

15. The combination in a pitch control mechanism as set forth in claim 14, wherein the cam comprises a plate connected with said first lever and perpendicular to said lever axis which plate has a cam slot therein, wherein said follower fits within said cam slot, and wherein a means is provided which cooperates with said actuating arm to guide the beam for movement in parallelism.

16. The combination in a pitch control mechanism as set forth in claim 15, wherein the actuating arm is substantially perpendicular to said supporting arm, and wherein said beam and the axis of said supporting arm are in superimposed relationship.

17. The combination in a pitch control mechanism as set forth in claim 16, wherein said beam is below the axis of said supporting arm.

18. The combination in a pitch control mechanism as set forth in claim 10, wherein there is provided a horizontal rockshaft, wherein said first lever is secured to said shaft, wherein the first said supporting arm is carried by said rockshaft but is pivotally movable thereon, wherein a second supporting arm is secured to said rockshaft for movement therewith, and wherein said third lever is pivotally connected with said second supporting arm to be supported thereby so that said second lever and the second link are moved bodily upwardly and downwardly at the same rate as the rate of upward and downward movement of the azimuth assembly by the first lever and the first link.

19. The combination in a pitch control mechanism as set forth in claim 18,
wherein a cam plate is connected with said first lever which cam plate is perpendicular to the shaft axis and has a cam slot therein,
wherein a cam follower is provided which fits said cam slot,
wherein there is provided an actuating arm rigidly connected with said first supporting arm, and
wherein there is provided a beam which is pivotally connected with said actuating arm and which carries said cam follower, said beam serving in conjunction with the cam and the cam follower to act upon said actuating arm for angularly moving the supporting arm relatively to said shaft.

20. The combination in a pitch control mechanism as set forth in claim 19,
wherein the actuating arm is substantially perpendicular to said first supporting arm, and
wherein said beam is below said shaft.

References Cited in the file of this patent

UNITED STATES PATENTS

| | | |
|---|---|---|
| 2,599,690 | Buivid et al. | June 10, 1952 |
| 2,877,856 | Campbell | Mar. 17, 1959 |